Sept. 21, 1965 A. SCHURE ETAL 3,206,871
CODED MATRIX FOR TEACHING DEVICE
Filed Oct. 31, 1963 2 Sheets-Sheet 1
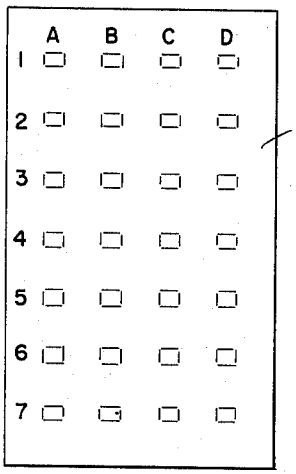
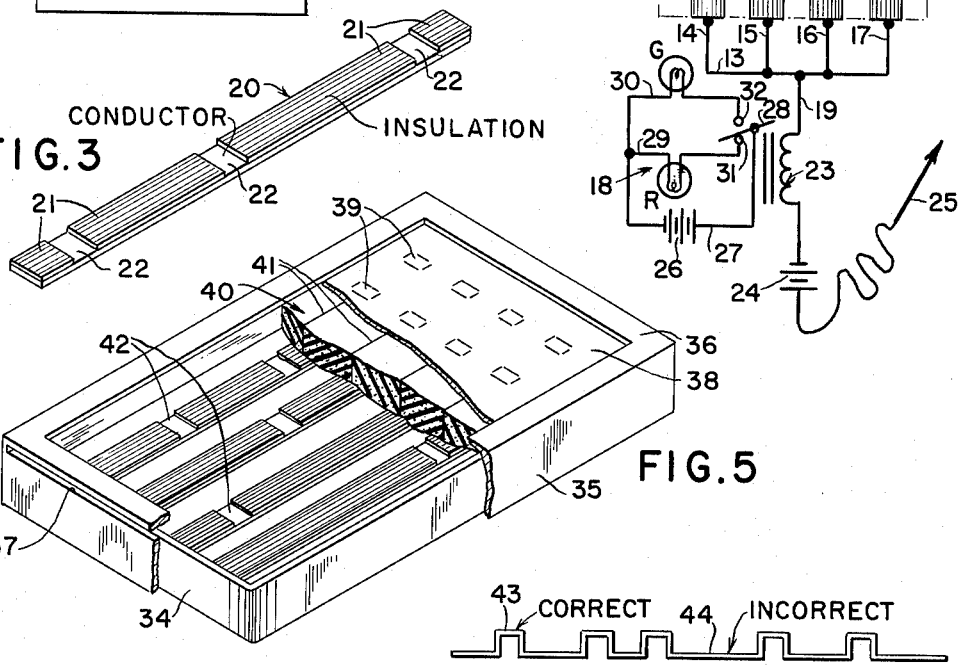
ALEXANDER SCHURE
SHELDON LITTWIN
INVENTORS.
BY
ATTORNEYS Sept. 21, 1965        A. SCHURE ETAL        3,206,871
CODED MATRIX FOR TEACHING DEVICE
Filed Oct. 31, 1963                    2 Sheets-Sheet 2

ALEXANDER SCHURE
SHELDON LITTWIN
INVENTORS.

ATTORNEYS

United States Patent Office 3,206,871
Patented Sept. 21, 1965

3,206,871
CODED MATRIX FOR TEACHING DEVICE
Alexander Schure, 274 Beach 141st St., Belle Harbor, Long Island, N.Y., and Sheldon Littwin, 3821 Garvey Place, Fair Lawn, N.J.
Filed Oct. 31, 1963, Ser. No. 320,311
4 Claims. (Cl. 35—9)

This invention is a continuation-in-part of our copending application U.S. Serial No. 279,534, filed on May 10, 1963, now Patent No. 3,187,443.

This invention relates to a coded matrix for use with an electrically operable teaching device and, in particular, to a coded compromise-proof matrix adapted to measure the individual progress rate of a student in conjunction with reinforced programmed learning.

In the aforementioned copending application, we disclose a teaching and testing device for reinforced programmed learning utilizing a punch card data gathering element in combination with a response matrix operated by a student. Coincident with making a response to an informational stimulant, the student operating the matrix stores the result of said response on a perforatable card for data processing purposes. In its broad aspects, the device comprises a circuit for indicating a desired response to a stimulant presented in the form of a question, a master matrix operable by a teacher for setting up a circuit for receiving the student's response stimulant, and a response matrix coupled to said circuit and said master matrix and operable by a student for indicating the student's response to the stimulant. The response matrix has a punch card data gathering element associated therewith having a plurality of pre-arranged perforatable spaced areas in indexing relationship with a network of response units formed of rows of electrically conductive elements. An electrically conductive probe means operable by the student is provided for perforating the punch card element when in indexing position with the response matrix and for simultaneously energizing the circuit via electrical contact with a response unit correlated to a perforatable area on the card. Upon piercing the card and contacting a response unit indexed therewith the result of the manipulation is indicated via signal means in the circuit, e.g. a green or red light depending upon whether the response is right or wrong, and a permanent record thereof is made on the card for data processing purposes. Thus, the student obtains an immediate visual reinforcement as to his response as he is preparing a permanent record on the punch card element.

In the aforementioned parent case, the response matrix is coupled to a master matrix controllable by a teacher so that the teacher can exercise some measure of control during class instruction, particularly where a plurality of response or student matrices are coupled to the master matrix. It would be desirable to have a self-contained testing device operable by a student alone capable of permitting his own individual progress rate and in which the teaching program is pre-arranged in the device by utilizing coded elements or response units adapted to give a desired response depending upon the student's ability to select the correct response unit after being provided with an informational stimulant.

It is thus an object to provide a coded matrix for a teaching device adapted for self instruction via programmed learning.

Another object is to provide a coded matrix capable via circuit means of immediate psychological reinforcement during an instructional and learning period.

A further object is to provide a correlated testing and data gathering device capable of a variety of codes for use with programmed learning.

These and other objects will more clearly appear when taken in conjunction with the following disclosure and the accompanying drawing, wherein:

FIG. 1 is illustrative of one form of a punch card data storing card or element which may be employed without teaching and testing device;

FIG. 2 shows somewhat diagrammatically a set of coded conductor elements coupled to an indicating circuit and showing a data storing card in phantom association therewith;

FIGS. 3 and 4 are illustrative of two embodiment of a coded element which may be used in providing response units within the response matrix provided by the invention;

FIG. 5 shows substantially in three dimensions one embodiment of a matrix for carrying out the invention.

Figure 6:
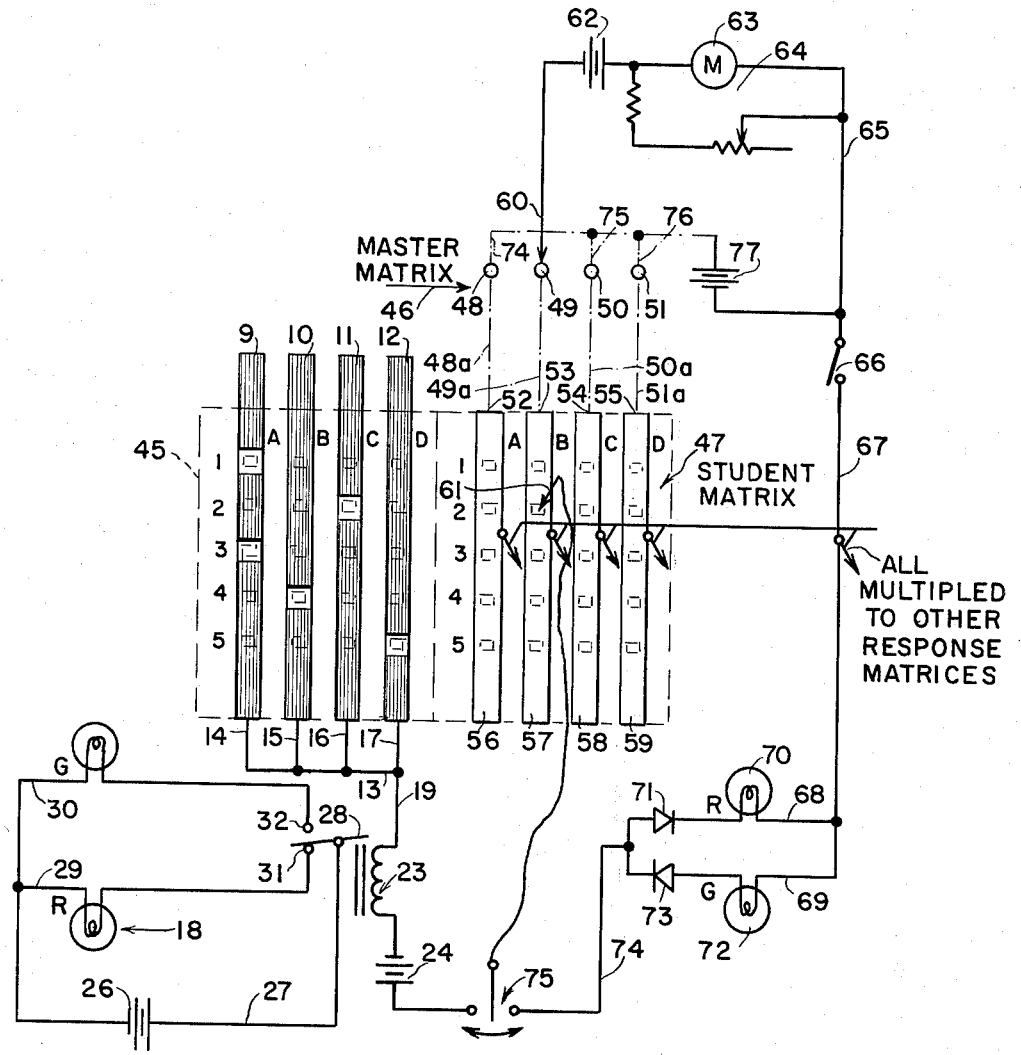
FIG. 6 shows in combination a coded response matrix used in conjunction with another response matrix wherein the latter is coupled to a master matrix for use in class instruction.

With regard to a preferred embodiment of our invention, we provide a testing device comprising a circuit for indicating a desired response to a stimulant, a matrix coupled to said circuit formed of a plurality of spaced response units, at least one of said units being coded to correlate to a correct response and at least one other of said units being coded to correlate to an incorrect response, such that by prearranging the units in the matrix a coded program is provided. A penetrable shield is provided to cover said response units and conceal them from view for rendering them compromise proof. The shield is adapted to receive a punch card data gathering element on the surface thereof in indexing relationship with the response units of the matrix, the shield being penetrable via an electrically conductive probe adapted to pierce a selected area of the card and penetrate the shield with the purpose of making contact with a correct response unit.

Referring first to FIG. 1, a standard punch card data storing element 8a is shown with a selected array of perforatable spaced areas in numbered horizontal rows designated by way of example with the numerals 1 to 7 and vertical columns designated by the letters A, B, C and D. The arrangement shown may represent a series of seven questions, each having one correct answer out of a possible of four answers A, B, C and D. The selected areas of the card are arranged to index with response units of a student's response matrix as depicted diagrammatically in FIG. 2 by the general designation 8 which shows card 8a in phantom association with conductor bars 9, 10, 11 and 12 which are joined to a common conductor 13 via lines 14 to 17 and thence coupled to the indicating circuit designated generally by the numeral 18 via line 19.

The conductor bars are preferably coded by utilizing a segmented insulative coating but is not limited thereto. A variety of methods may be employed as will be apparent to one skilled in the art. Such a coded bar is shown substantially in three dimensions in FIG. 3 as comprising a conductor element 20 of, for example, copper, segmentally coated with an insulation 21 of, for example, rubber, plastic or other substantially non-conductive material. The uncoated spaces or units 22 remaining provide electrically conductive surfaces whose particular location is dependent upon the answer code desired to be set up in the matrix as will be apparent from FIG. 2.

Referring to element 9 of FIG. 2, it will be noted that two conductive response spaces or units are provided at rows 4 and 7 of column A, the remaining units at rows 1, 2, 3, 5 and 6 being insulated. Spaces 4A and 7A are coded to be the correct responses to questions 4 and 7 set forth on a question sheet which is provided the student. Similarly, element 9 has also been coded to provide two conductive response spaces or units 1B and 3B which correspond to the correct responses of questions 1 and 3. Element 11 has two conductive response spaces or units 2C and 5C corresponding to the correct responses to questions 2 and 5, while element 12 has only one conductive response space 6D corresponding to the correct response for question 6. Thus, the correct answers to seven questions are coded beforehand in the matrix unlike the method employed in our aforementioned parent application wherein a master matrix controlled by the teacher is employed for setting up the circuit for indicating a correct response by a student through his own response matrix.

As has been stated with regard to FIG. 2, the response matrix 8 is coupled to an indicating circuit 18 via line 19, a relay 23, batteries or other source of power 24 and electrically conductive probe 25 operable by a student for making contact with a coded response unit of the matrix. A circuit containing red and green lamps is provided having batteries or other source of power 26 connected via line 27 to a pivotally mounted switch element 28 which is part of relay 23. Two branch lines 29 and 30 are provided containing red and green lamps "R" and "G," respectively, said branch lines having contact points 31 and 32 for cooperating with pivotally mounted switch 28 of relay 23. The pivotally mounted switch is biased via spring means (not shown) to the red lamp circuit.

Assuming a student has been given a series of seven questions, the correct answers to which have been previously coded in the student matrix as shown in FIG. 2, the student proceeds as to question 1 given by way of example as follows:

(1) The war with Japan was declared on:
    A. September 1, 1938
    B. December 7, 1941
    C. June 6, 1944
    D. November 11, 1918

Assuming further that the student indicates the correct answer by inserting the probe in the matrix through the card into the space corresponding to 1B as shown by arrow 34, relay 23 is actuated causing switch element 28 to pivot to contact point 32, thus turning off the red lamp and putting on the green lamp as constituting the correct answer. Had the student placed the probe in spaces 1A, 1C or 1D, the red lamp would have remained on since the circuit would not be completed thus denoting the wrong answer. In the meantime, the card is perforated and a permanent record made as to the student's response to the question and to any of the succeeding questions. If desired, a holding circuit may be coupled with the green lamp so that the green lamp when actuated remains on when the probe is removed and then released by pressing a button. Such a holding circuit is disclosed in our aforementioned copending case.

As shown in FIG. 2, the relay-actuated switch 28 is biased to maintain contact with the red lamp circuit. Thus, when a student makes an incorrect response, the red lamp stays on. It is possible that sometimes during the operation of a circuit, a probe, unknown to the person operating the device, may not make sufficient contact to complete a circuit. Such a contingency is provided for in our copending case wherein a subsidiary response circuit is cooperably associated with the probe indicating circuit and adapted to indicate via another light, e.g. a neon light, whether the teaching circuit has been made. Thus, in the situation where the red lamp remains on, the activation of the neon light confirms that the question has been answered.

One type of response matrix which may be employed in carrying out the invention is depicted in FIG. 5 which shows in three dimensions, partially broken away, a rectangularly shaped matrix carrier or base 34 having an annular frame 35 of hard plastic or other suitable material snugly fitted about the periphery of the carrier. The frame has a peripheral flange 36 which extends inwardly of said frame as shown, a slit 37 being provided at the lower end of the frame (partially broken away) through which the punch data gathering card 38 is inserted into position. A section of the card is shown with perforatable areas 39 lying on top of penetrable shield 40 comprising a plurality of flat longitudinal strips of preferably resilient material, such as sponge rubber, adjacently arranged along their long edges 41 in abutting relationship. Beneath the penetrable shield are disposed a plurality of segmentally insulated coded bars 42, each of the bars being centrally located beneath and in parallel with abutting longitudinal edge 41 of the shielding strips. The perforatable areas 39 of the punch data gathering card 38 are likewise arranged so as to be centrally located along abutting edges 41 and thereby be in indexable relationship with the coded bars beneath the shielding strips. By inserting the probe into one of the selected areas 39, the probe penetrates the shield between the abutting shield strip edges 41 and makes contact with coded bar 42 indexed beneath said selected area 39. The coded bars are coupled to a circuit and probe not shown, the coupling arrangement being similar to that shown in FIG. 2.

As has been stated hereinbefore, the penetrable shield renders the matrix compromise proof by concealing the coded bars from view. While we prefer a shield made up of elements of resilient material, the shield may take any form. For example, the shield may comprise a perforated sheet of opaque material, said perforations being indexed with the perforatable areas of the punch card element.

The coded response units employed in the matrix need not be limited to coded bars of the type shown in FIG. 3. Another form may comprise a continuous copper strip preformed to form two levels as shown in FIG. 4, the top level 43 shown corresponding to the correct answer, the lower level corresponding to the incorrect answer. The lower level is out of reach of the probe, a stop being provided just above the lower level to prevent contact between it and the probe.

One of the advantages of using a coded bar is that the bars can be shifted longitudinally in position so as to provide any variety of answer codes. For example, referring to FIG. 2, coded bar 9 can be shifted downward so as to move the space at 4A down to 5A or 6A, depending on the code desired, and so on with elements 10, 11 and 12. One method would be to make the coded bars movable by a vernier screw so that one revolution of the screw would move the strip upward or downward by one or more location positions. Or, if desired, the bars can be positioned by a scale in the same manner as a slide rule. In the alternative, the punch card data storing element may be arranged so as to permit up and down movement thereof in approximately slide-rule fashion, whereby to vary or alter the code.

It will be apparent to one skilled in the art that means may be provided for automatically moving the punch card to a predetermined coded position. For example, the matrix may include a motor responsive to an electrical impulse coming from a master station to move the card a predetermined incremental amount. Thus by appropriate coding or indexing, a card can be used for any test.

The coded matrix may be employed in combination with the master-student matrix circuit shown and described in our aforementioned copending application Serial No. 279,534. A matrix carrier of the type shown in FIG. 5 may be employed which will receive a card having a left hand portion with four vertical columns for use with the coded matrix and a right hand portion with four vertical columns for use with a master-student matrix circuit. The number of columns are merely illustrative, as each half of the card may contain any number of columns, depending upon their arrangement.

Referring to FIG. 6, a punch data storing card 45 is shown phantomly, the left half of which is cooperably related with its own circuit and the right half of which is cooperably related with master circuit 46 and student matrix 47. The right half portion would be preferably used during class instruction, it being understood that a plurality of other student matrices may be coupled in parallel to the master matrix.

With regard to the right half portion of FIG. 6, the master matrix is shown comprising positions 48 to 51 coupled remotely via wiring 48a to 51a to positions 52 to 55 of the student matrix at the end portions of conductor bars 56 to 59. Probes or switches 60 for the master matrix and 61 for the student matrix are provided. Probe 61 is shown connectable via switch 75 to line 74 of the circuit. Probe or switch 60 is coupled to battery 62 or other suitable source of power, and make up a circuit comprising meter 63 and assoicated circuit 64, line 65, circuit switch 66 and line 67 which connects to branch lines 68 and 69 which are in parallel with each other. Branch line 68 contains a red lamp 70 and a diode 71 adapted to pass current in one direction only. In branch line 69, a green lamp 72 is provided also having associated therewith a diode 73 coupled in a direction reverse to that of diode 71. Both branch lines are connected to probe 61 as shown. Instead of using the diode circuit as the indicating circuit, it will be apparent that the relay circuit shown on the left side of the system may be employed for both individual testing as well as for group testing. Thus, in place of the diode circuit, the relay 23 and associated circuit 18 may be coupled between lines 67 and 74 by appropriate switching means.

In the master matrix, probe or switch 60 is adapted when manipulated to short out all but one of the positions 48 to 51 and keep open the position with which it makes contact. Thus, with probe or switch 60 contacting position 49, line 49a of position 49 is open while the rest are automatically shorted out as suggested by dotted lines 74, 75 and 76 through battery or other source of power 77 which is connected to line 65.

In conducting a lecture followed by a sampling of the class to determine comprehension, the instructor upon completion of the lecture would ask one of a series of questions having one of four answers (A, B, C and D), close switch 66 and then place his probe in the correct position 49 (column B) as shown while simultaneously shorting out positions 74, 75 and 76. Assuming the question is No. 2, the student in making the correct response places his probe in position 2B. As will be apparent from the circuit of FIG. 6, the green light goes on as current flows from battery 62, closed switch 66, line 67, through line 69, green lamp 72, diode 73 and to student's probe 61. The teacher may repeat the lecture depending upon class comprehension and then decide that the class is ready to take a review examination of the subject matter. In that case, he will pass out an exam sheet, and instruct the students to test themselves utilizing the coded half of the matrix (the left side in FIG. 6) which is substantially the same as the circuit and the diagrammatic representation shown in FIG. 2, and, therefore, the same numeral designations have been retained except for probe 61 which may be coupled to either circuit via switch 75. When the student has finished, he submits his perforated examinatioin card to the teacher who now has two records on one card, the results of sample test questions given during class instruction and the results of an actual test on the same lecture conducted by the student himself at his own progress rate. Comparison of the actual test with the sample test can be made expeditiously by passing the card through a data processing machine, as well as a comparison by class or section obtained.

It is apparent from the foregoing that the coded matrix has considerable utility in programmed learning, particularly where psychological reinforcement is an important element of the learning process.

While the present invention has been broadly described relative to a teaching system, it will be appreciated that the invention can be extended to other areas of use. For example, the device can be used as an educational toy or in games of chance involving a master and a group of players each of whom work through the master in providing a response in reply to stimuli set up by the master. The term "teaching system" employed herein is meant to encompass such use.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a teaching system, a testing device comprising a circuit for indicating a desired response to a stimulant, a matrix coupled to said circuit formed of a plurality of spaced conductor bars, each of said bars having a group of segments spaced along the length thereof with electrically conductive spaces between said segments coupled to said circuit for indicating a desired response to a stimulant, said electrically conductive spaces of the conductor bars being arranged to provide a variety of coded information, a penetrable shield covering and concealing said conductor bars from view, said penetrable shield being formed of a plurality of longitudinal strips of resilient material adjacently arranged with their side edges in substantially abutting relationship, each of said substantially abutting edges being disposed above and along each corresponding conductor bar, an electrically conductive probe means connected to said circuit for contacting an electrically conductive space of a coded bar by insertion through said penetrable shield, and signal means coupled to said circuit for indicating said response when an electrically conductive space is contacted by said probe.

2. In a teaching system, a testing device comprising a circuit for indicating a desired response to a stimulant, a matrix coupled to said circuit formed of a plurality of spaced conductor bars, each of said bars having a group of insulatively coated segments spaced along the length thereof with electrically conductive spaces between said segments, said electrically conductive spaces being coupled to said circuit for indicating said desired response to a stimulant and being arranged to provide a variety of coded information, a penetrable shield covering and concealing said conductor bars from view, said penetrable shield being formed of a plurality of longitudinal strips of resilient material adjacently arranged with their side edges in substantially abutting relationship, each of said substantially abutting edges being disposed above and along each corresponding conductor bar, a punch card data gathering element supported on said penetrable shield having a plurality of prearranged perforatable areas thereon indexable with said coded conductor bars of said matrix, an electrically conductive probe means connected to said circuit for contacting a selected electrically conductive space of a coded bar by insertion through said penetrable shield, and signal means coupled to said circuit for indicating said response when an electrically conductive space is contacted by said probe.

3. In a teaching system, a testing device comprising a circuit for indicating a desired response to a stimulant, a master matrix coupled to said circuit comprising a plurality of spaced conductors and an electrically conductive probe means cooperably associated with said master matrix for preparing said circuit to indicate said desired response, a response matrix having a first and second portion, said first portion also comprising a plurality of spaced conductors and an electrically conductive probe means cooperating therewith coupled to said circuit and to said master matrix and controllable by a student to indicate his response to said stimulant, said first portion of the response matrix energizing said circuit only when said student indicates said desired response, signal means electrically coupled to said circuit for indicating the result of said response, the second portion of said matrix having cooperably associated therewith an independent circuit for indicating a desired response to a stimulant, said second portion matrix being comprised of a plurality of spaced response units, at least one of said units being coded to yield a correct response and at least one other of said units being coded to yield an incorrect response, said units being arranged to provide a variety of coded information, a penetrable shield covering and concealing said units from view, said penetrable shield being formed of a plurality of longitudinal strips of resilient material adjacently arranged with their side edges in substantially abutting relationship, each of said substantially abutting edges being disposed above and along each corresponding conductor bar, and electrically conductive probe means coupled to the second portion circuit for contacting a selected response unit by insertion through said penetrable shield, and signal means coupled to the second portion circuit for indicating said response, said second portion of said matrix being operable independent of said first portion.

4. In a teaching system, a testing device comprising a circuit for indicating a desired response to a stimulant, a master matrix coupled to said circuit comprising a plurality of spaced conductors, an electrically conductive probe means cooperably associated with said master matrix for preparing said circuit to indicate said desired response, a response matrix having a first and second portion, said first portion also comprising a plurality of spaced conductors and an electrically conductive probe means cooperating therewith coupled to said circuit and master matrix and controllable by a student to indicate his response to said stimulant, said response matrix energizing said circuit only when said student indicates said desired response, signal means electrically coupled to said circuit for indicating the result of said response, the second portion of said matrix having cooperably associated therewith an independent circuit for indicating a desired response to a stimulant, said second portion matrix being comprised of a plurality of spaced conductor bars, each of said bars having a group of segments spaced along length thereof with electrically conductive spaces between said segments, said electrically conductive spaces being arranged to provide a variety of coded information, a penetrable shield covering and concealing said conductor bars from view, said penetrable shield being formed of a plurality of longitudinal strips of resilient material adjacently arranged with their side edges in substantially abutting relationship, each of said substantially abutting edges being disposed above and along each corresponding conductor bar, an electrically conductive probe means coupled to said circuit for contacting a selected electrically conductive space of a coded bar by insertion through said penetrable shield, and signal means coupled to said circuit for indicating said response, said second portion of said matrix being operable independent of said first portion when an electrically conductive space is contacted by said probe.

References Cited by the Examiner

UNITED STATES PATENTS

| | | | |
|---|---|---|---|
| 2,562,179 | 7/51 | Dorf | 35—48 |
| 2,943,400 | 7/60 | Griswold | 35—9 |
| 3,057,082 | 10/62 | Wellington et al. | 35—9 |
| 3,100,352 | 8/63 | Boissevain | 35—9 |
| 3,106,027 | 10/63 | Thelen | 35—9 |
| 3,106,784 | 10/63 | Raley | 35—9 |

EUGENE R. CAPOZIO, *Primary Examiner.*

LAWRENCE CHARLES, JEROME SCHNALL,
*Examiners.*